UNITED STATES PATENT OFFICE.

NICHOLAS G. RICHARDSON, OF TYAQUIN MONIVEA, COUNTY OF GALWAY, AND WILLIAM SMITH, OF GOLDEN BRIDGE MILLS, COUNTY OF DUBLIN, IRELAND.

MANUFACTURE OF PAPER.

SPECIFICATION forming part of Letters Patent No. 246,206, dated August 23, 1881.

Application filed January 19, 1881. (No specimens.) Patented in England September 23, 1880.

*To all whom it may concern:*

Be it known that we, NICHOLAS GOSSELIN RICHARDSON, of Tyaquin Monivea, in the county of Galway, and WILLIAM SMITH, of Golden Bridge Mills, in the county of Dublin, Ireland, have invented certain Improvements in the Manufacture of Paper, of which the following is a specification.

Our invention for making paper consists in the employment of a new vegetable substance combined with other substances now used in the manufacture; or such vegetable substance can be used alone to make from it, by the aid of the usual appliances or apparatus, a pulp from which the paper is made. The vegetable substance we use is *Molinea cœrulea*, otherwise *Melica cœrulea*, commonly known as "melic-grass." This grass is converted into pulp or half-stuff, and same can, as hereinbefore mentioned, be by the usual appliances or apparatus converted into paper, or such substance as may be combined with any of the substances usually employed in the manufacture of paper.

The melic-grass grows in bogs and is agriculturally worthless, but has a vastly larger proportion of paper-making fiber than any vegetable substance hitherto known—namely, about sixty-seven per cent. The stem has but one knot, which is near the ground and below the cut, so that when boiling it is not necessary to use so much caustic as is now employed, and there being no knots, the stem is uniformly boiled. Hence it will be observed that a more uniform article of paper may be manufactured at a greatly-reduced cost out of this material.

Having now described our improvements, we hereby declare that we claim—

The application of *Molinea cœrulea* (commonly known as "melic-grass") to the manufacture of paper, substantially as hereinbefore set forth and described.

The above specification signed by us this 3d day of November, 1880.

NICH. G. RICHARDSON. [L. S.]
W. SMITH. [L. S.]

Witnesses:
GEORGE PATMAN,
 35 *College Green, Dublin, Gentleman.*
H. GEO. WHITE,
 35 *College Green, Dublin, Book-keeper.*